(12) United States Patent
Elad et al.

(10) Patent No.: US 11,989,134 B2
(45) Date of Patent: May 21, 2024

(54) APPARATUS AND METHOD

(71) Applicant: ARM LIMITED, Cambridge (GB)

(72) Inventors: Yuval Elad, Cambridge (GB); Jason Parker, Cambridge (GB); Richard Roy Grisenthwaite, Cambridge (GB); Simon John Craske, Cambridge (GB); Alexander Donald Charles Chadwick, Cambridge (GB)

(73) Assignee: Arm Limited, Cambridge (GB)

( * ) Notice: Subject to any disclaimer, the term of this patent is extended or adjusted under 35 U.S.C. 154(b) by 59 days.

(21) Appl. No.: 17/907,178

(22) PCT Filed: Mar. 8, 2021

(86) PCT No.: PCT/GB2021/050574
§ 371 (c)(1),
(2) Date: Sep. 23, 2022

(87) PCT Pub. No.: WO2021/191585
PCT Pub. Date: Sep. 30, 2021

(65) Prior Publication Data
US 2023/0236987 A1    Jul. 27, 2023

(30) Foreign Application Priority Data

Mar. 24, 2020 (GB) .................... 2004259

(51) Int. Cl.
*G06F 12/00* (2006.01)
*G06F 3/06* (2006.01)
*G06F 12/10* (2016.01)

(52) U.S. Cl.
CPC ............ *G06F 12/10* (2013.01); *G06F 3/0622* (2013.01); *G06F 3/0637* (2013.01); *G06F 3/0673* (2013.01)

(58) Field of Classification Search
CPC ...... G06F 12/10; G06F 3/0622; G06F 3/0637; G06F 3/0673; G06F 12/1009;
(Continued)

(56) References Cited

U.S. PATENT DOCUMENTS 10,216,927 B1* 2/2019 Steinberg ................ G06F 21/53
2003/0167292 A1* 9/2003 Ross ...................... G06F 9/3842
712/E9.05

(Continued)

*Primary Examiner* — Shawn X Gu
*Assistant Examiner* — Mohammad S Hasan
(74) *Attorney, Agent, or Firm* — NIXON & VANDERHYE P.C.

(57) ABSTRACT

An apparatus comprising translation circuitry to perform a translation operation to generate a translated second memory address within a second memory address space as a translation of a first memory address within a first memory address space, in which the translation circuitry is configured to generate the translated second memory address in dependence upon translation information stored at one or more translation information addresses; permission circuitry to perform an operation to detect permission information to indicate, for a given second memory address, whether memory access is permitted to the given second memory address; and access circuitry to allow access to data stored at the given second memory address when the permission information indicates that memory access is permitted to the given second memory address.

20 Claims, 14 Drawing Sheets

(58) Field of Classification Search
CPC .............. G06F 12/1036; G06F 12/1491; G06F 2212/1052; G06F 2212/656; G06F 2212/657; G06F 12/1475; G06F 12/145; G06F 12/1425; G06F 2212/1024
See application file for complete search history.

(56) References Cited

U.S. PATENT DOCUMENTS

| | | |
|---|---|---|
| 2004/0177269 A1 | 9/2004 | Belnet et al. |
| 2011/0066811 A1* | 3/2011 | Sander ................ G06F 12/0815 711/E12.001 |
| 2015/0356029 A1* | 12/2015 | Craske ................ G06F 12/1441 711/163 |
| 2017/0286326 A1 | 10/2017 | Guim et al. |
| 2017/0344492 A1* | 11/2017 | Bolbenes ............ G06F 12/1009 |
| 2018/0165218 A1* | 6/2018 | Parker ................ G06F 12/1009 |
| 2019/0095343 A1 | 3/2019 | Gopal |
| 2021/0334220 A1* | 10/2021 | Petz .................... G06F 12/1458 |

* cited by examiner

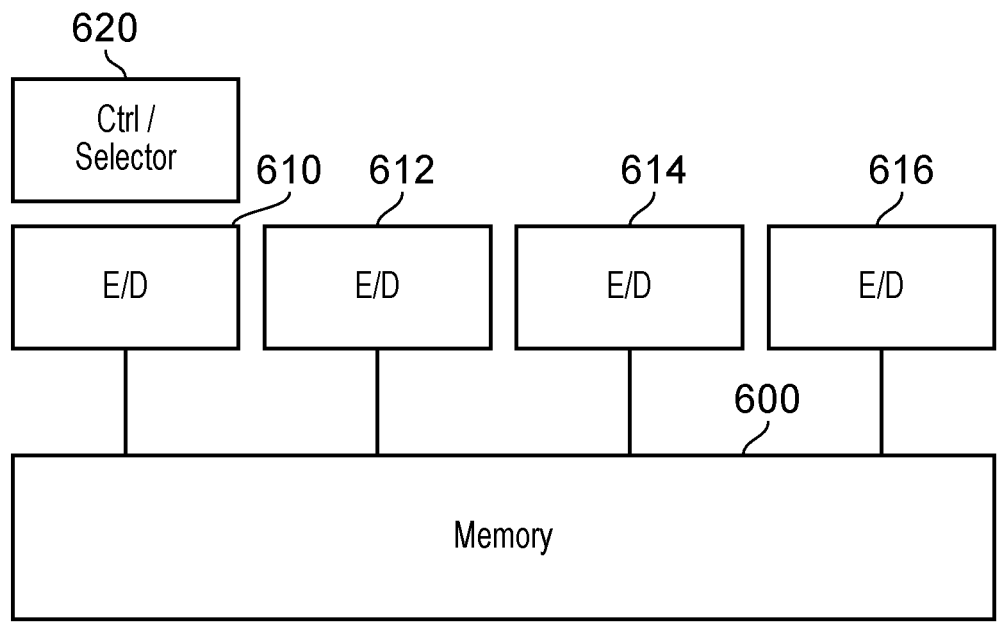
FIG. 6
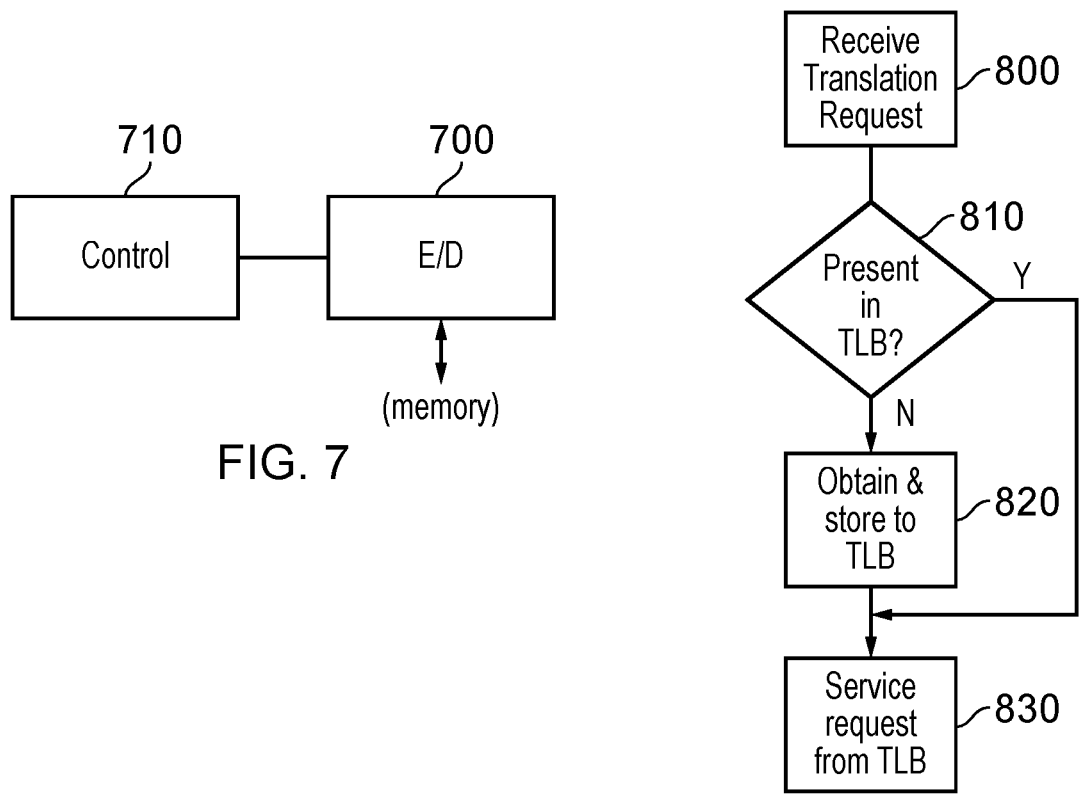
FIG. 7
FIG. 8

APPARATUS AND METHOD

BACKGROUND

This disclosure relates to apparatus and methods.

A data processing system may have address translation circuitry to translate a virtual address of memory access request to a physical address corresponding to a location to be accessed in a memory system.

The process of generating such an address translation may itself require multiple memory accesses.

SUMMARY

In an example arrangement there is provided apparatus comprising:

translation circuitry to perform a translation operation to generate a translated second memory address within a second memory address space as a translation of a first memory address within a first memory address space, in which the translation circuitry is configured to generate the translated second memory address in dependence upon translation information stored at one or more translation information addresses;

permission circuitry to perform an operation to detect permission information to indicate, for a given second memory address, whether memory access is permitted to the given second memory address; and access circuitry to allow access to data stored at the given second memory address when the permission information indicates that memory access is permitted to the given second memory address;

the access circuitry being configured to selectively allow access by the translation circuitry to a translation information address without the permission circuitry having completed the operation to detect permission information to indicate whether memory access is permitted to that translation information address.

In another example arrangement there is provided a method comprising:

performing a translation operation to generate a translated second memory address within a second memory address space as a translation of a first memory address within a first memory address space, comprising generating the translated second memory address in dependence upon translation information stored at one or more translation information addresses;

performing an operation to detect permission information to indicate, for a given second memory address, whether memory access is permitted to the given second memory address;

accessing data stored at the given second memory address when the permission information indicates that memory access is permitted to the given second memory address; and selectively accessing a translation information address without the permission circuitry having completed the operation to detect permission information to indicate whether memory access is permitted to that translation information address.

In another example arrangement there is provided a computer program for controlling a host data processing apparatus to provide an instruction execution environment for execution of target code; the computer program comprising:

translation logic to perform a translation operation to generate a translated second memory address within a second memory address space as a translation of a first memory address within a first memory address space, in which the translation logic is configured to generate the translated second memory address in dependence upon translation information stored at one or more translation information addresses;

permission logic to perform an operation to detect permission information to indicate, for a given second memory address, whether memory access is permitted to the given second memory address; and access logic to allow access to data stored at the given second memory address when the permission information indicates that memory access is permitted to the given second memory address;

the access logic being configured to selectively allow access by the translation logic to a translation information address without the permission logic having completed the operation to detect permission information to indicate whether memory access is permitted to that translation information address.

Further respective aspects and features are defined by the appended claims.

BRIEF DESCRIPTION OF THE DRAWINGS

The present technique will be described further, by way of example only, with reference to embodiments thereof as illustrated in the accompanying drawings, in which:

FIGS. 6 and 7 schematically illustrate data encryption and decryption;

FIG. 8 schematically illustrates an aspect of an example memory management unit (MMU) operation;

DESCRIPTION OF EMBODIMENTS

Figure 1:
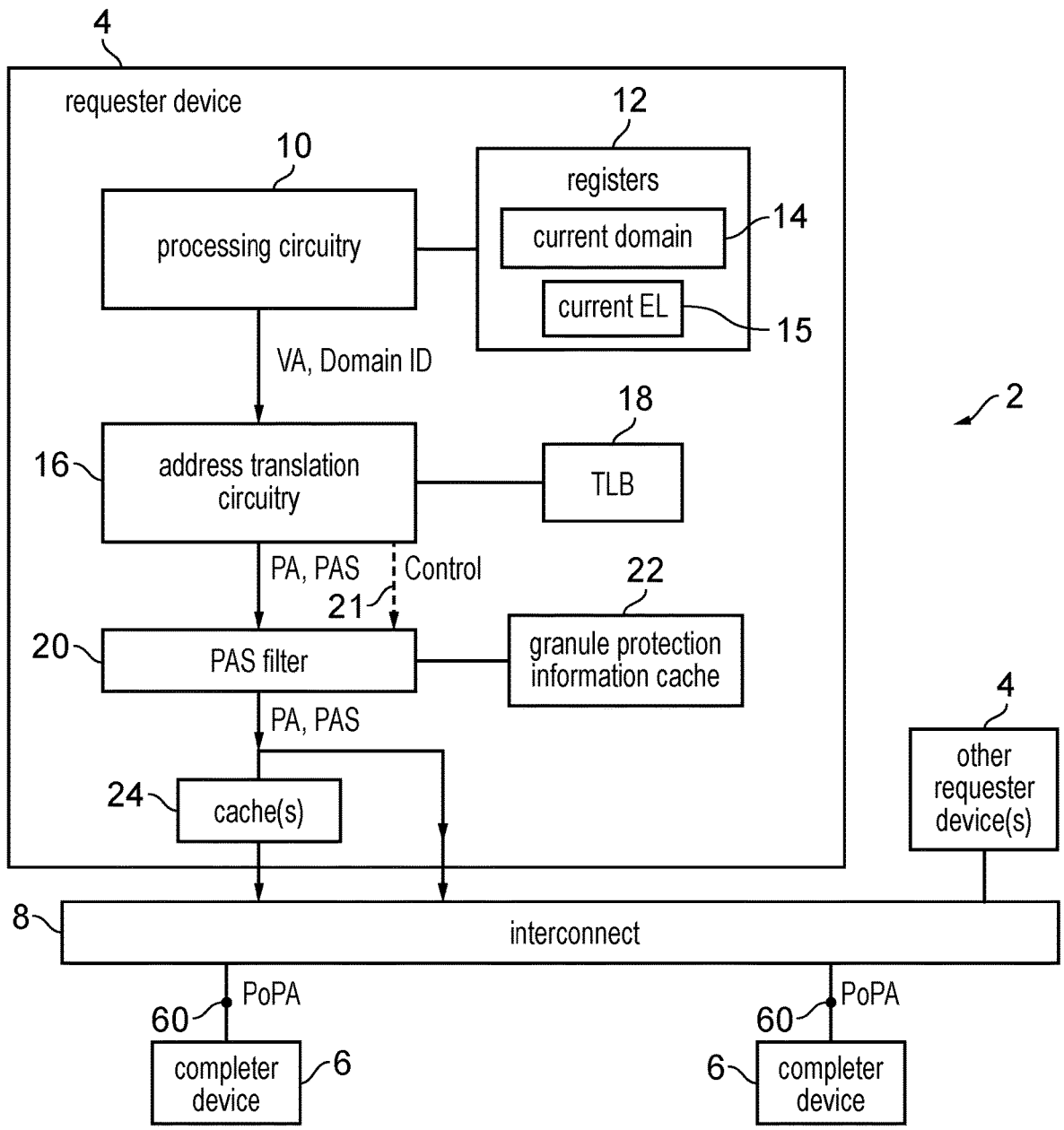
FIG. 1 illustrates an example of a data processing apparatus.

Before discussing the embodiments with reference to the accompanying figures, the following description of embodiments is provided.

An example embodiment provides apparatus comprising:
translation circuitry to perform a translation operation to generate a translated second memory address within a second memory address space as a translation of a first memory address within a first memory address space, in which the translation circuitry is configured to generate the translated second memory address in dependence upon translation information stored at one or more translation information addresses;

permission circuitry to perform an operation to detect permission information to indicate, for a given second memory address, whether memory access is permitted to the given second memory address; and access circuitry to access data stored at the given second memory address when the permission information indicates that memory access is permitted to the given second memory address;

the access circuitry being configured to access a translation information address without the permission circuitry having completed the operation to detect permission information to indicate whether memory access is permitted to that translation information address.

The disclosure recognises that operations such as those performed by translation circuitry, for example a memory management unit or MMU, can themselves involve many memory accesses. Where it is necessary to obtain permission information before each of those accesses, the obtaining of the permission information can introduce a large overhead into the generation of a translation, particularly where the permission information is also held in memory. This can be a particular issue in the context of a multiple stage MMU.

In example arrangements, access is allowed to at least some translation information, being information (such as so-called page table entries) used by the translation circuitry to generate a translation, in the absence of a process to obtain permission information having completed.

Such arrangements can help to reduce the latency associated with obtaining a memory address translation.

Although these arrangements could apply to read and write operations by the translation circuitry, in example embodiments it is noted that (a) the majority of the latency associated with obtaining a translation generally relates to read operations by the translation circuitry, and (b) preceding in the absence of the process to obtain permission information having completed is potentially less of a security risk if the arrangements are restricted to read operations by the translation circuitry. Therefore, in example embodiments the access circuitry is configured to access a translation information address without the permission circuitry having completed the operation to detect permission information, when the access to that translation information address relates to a read access; and the access circuitry is configured to access a translation information address only when the permission information indicates that memory access is permitted to that translation information address, when the access to that translation information address relates to a write access.

In some examples, the permission circuitry is configured to perform a further operation to detect a storage type applicable to a given second memory address, the storage type at least whether a first storage type or a second, different, storage type is applicable to the given second memory address. For example, the access circuitry may be configured to access a translation information address without the permission circuitry having completed the operation to detect permission information to indicate whether memory access is permitted to that translation information address only when the storage type applicable to the translation information address is the first storage type. This is particularly relevant where the first storage type is a storage type for which the data stored at a given address is not altered by a read operation from the given address. For example, another storage type may be a storage type for which the data stored at the given address is potentially altered by a read operation from the given address, for example a storage type associated with input/output circuitry, such as an address which maps to a register such as a first-in-first-out (FIFO) register in which a read operation changes the nature of the data which would be read by a subsequent read operation.

In example arrangements, the operation to detect permission information may be deferred, whereas in other examples it may be omitted or elided. As an example in the case of at least partial elision, the permission circuitry is configured not to perform the operation to detect permission information in respect of at least some of the translation information addresses. As a further measure to avoid security risks resulting from proceeding in the absence of having obtained permission information, the translation circuitry may be configured not to provide, as an output to circuitry external to the translation circuitry (or indeed to software running on a processor accessing the translation circuitry), translation information retrieved from a translation information address in respect of which the operation to detect permission information has not been completed.

The disclosure is particularly applicable to translation circuitry in which the translation information applicable to translation of a given first memory address comprises a hierarchy of translation information entries (for example, so-called page table entries or PTEs), in which data representing a translation information address of a next translation information entry is indicated by a preceding translation information entry. In such arrangements, the data representing a translation information address of a next translation information entry may be indicative of at least a part of a first memory address applicable to the next translation information entry; and the translation circuitry is configured to perform the translation operation to generate a respective translation information address.

Such an arrangement may be useful in the context of deferral of the obtaining of permission information, for example in an arrangement in which the permission circuitry is configured to defer initiating the operation to detect permission information for a next translation information entry until after initiation of access to that next translation information entry.

Where the translation circuitry is operable in respect of memory access transactions, each memory access transaction being associated with a first memory address for translation, the translation circuitry associating a translated second memory address with each memory access transaction, the permission circuitry may be configured to perform the operation to detect permission information with respect to the translated second memory address for each memory access transaction, the access circuitry being configured to provide the results of an access to the translated second memory address for a memory access transaction only when access to that translated second memory address is permitted by the permission data.

In example arrangements relating to the operation of translation circuitry, the first memory address may comprise one of a virtual memory address and an intermediate physical address; and the second memory address may comprise a physical memory address.

The present techniques on particular suited to use with a memory having a plurality of memory partitions, each data memory partition being associated with a partition identifier and having a respective range of physical addresses within a physical address space. Here, the permission circuitry may be configured, as the operation to detect permission information: to detect a region identifier associated with a second memory address, the region identifier being selected from a plurality of region identifiers, each region identifier serving to indicate permission to access a respective set of the memory partitions, in which for at least one of the region identifiers, the respective set of the memory partitions comprises a subset of one or more but not all of the memory partitions; and to compare the detected region identifier with a partition identifier associated with the second memory address.

As a further layer of security to avoid memory accesses be made with an incorrect region identifier, the apparatus may comprise encryption and decryption circuitry to encrypt data for storage by the memory and to decrypt data retrieved from the memory; in which the encryption and decryption circuitry is configured to apply a respective encryption and corresponding decryption, of a set of encryptions and corresponding decryptions, to each memory partition, the set of encryptions and corresponding decryptions being such that data encrypted to a given memory partition by the respective encryption for that memory partition cannot be decrypted by applying the decryption for another memory partition.

In example arrangements the permission circuitry is configured to associate with a translated second memory address, data indicative of the region identifier associated with the translated second memory address.

The encryption and decryption operations may be arranged so that the encryption and decryption circuitry is configured to apply a decryption to decrypt data retrieved from the memory at a translated second memory address by applying a decryption selected according to the data indicative of the region identifier associated with that translated second memory address.

As a further measure to mitigate security risks resulting from the use of memory accesses in the absence of the operation to detect permission information having completed, and in the context of apparatus comprising one or more cache memories to hold data retrieved from and/or for storage to the memory, the cache memory may be configured to associate the respective region identifier with each data item held by the cache memory; and the cache memory may be configured to inhibit access to a data item associated with a given region identifier in response to a memory access associated with data indicating a different region identifier.

As a further measure to mitigate security risks resulting from the use of memory accesses in the absence of the operation to detect permission information having completed, the translation circuitry is configured to detect a translation fault in respect of a given translation operation when use, by the translation circuitry, of the translation information does not provide a valid address translation; and in response to detection of a translation fault, the translation circuitry is configured to control the permission circuitry to perform the operation to detect permission information in respect of any translation information addresses accessed as part of the given translation operation.

In example embodiments the apparatus comprises a processor to execute program instructions at a prevailing exception level selected from a hierarchy of exception levels, each exception level being associated with security privileges so that instructions executed at a higher exception level can access resources not accessible to instructions executed at a lower exception level; in which the processor is required to execute instructions at a highest of the exception levels in order to set data from which the permission circuitry detects permission information.

Another example embodiment provides a method comprising:

performing a translation operation to generate a translated second memory address within a second memory address space as a translation of a first memory address within a first memory address space, comprising generating the translated second memory address in dependence upon translation information stored at one or more translation information addresses;

performing an operation to detect permission information to indicate, for a given second memory address, whether memory access is permitted to the given second memory address;

accessing data stored at the given second memory address when the permission information indicates that memory access is permitted to the given second memory address; and accessing a translation information address without the permission circuitry having completed the operation to detect permission information to indicate whether memory access is permitted to that translation information address.

Another example embodiment provides a computer program for controlling a host data processing apparatus to provide an instruction execution environment for execution of target code; the computer program comprising:

translation logic to perform a translation operation to generate a translated second memory address within a second memory address space as a translation of a first memory address within a first memory address space, in which the translation logic is configured to generate the translated second memory address in dependence upon translation information stored at one or more translation information addresses;

permission logic to perform an operation to detect permission information to indicate, for a given second memory address, whether memory access is permitted to the given second memory address; and access logic to allow access to data stored at the given second memory address when the permission information indicates that memory access is permitted to the given second memory address;

the access logic being configured to selectively allow access by the translation logic to a translation information address without the permission logic having completed the operation to detect permission information to indicate whether memory access is permitted to that translation information address.

Introduction—Controlling Access to Physical Address Spaces

Data processing systems may support use of virtual memory, where address translation circuitry is provided to translate a virtual address specified by a memory access request into a physical address associated with a location in a memory system to be accessed. The mappings between virtual addresses and physical addresses may be defined in one or more page table structures. The page table entries within the page table structures could also define some access permission information which may control whether a given software process executing on the processing circuitry is allowed to access a particular virtual address.

In some processing systems, all virtual addresses may be mapped by the address translation circuitry onto a single physical address space which is used by the memory system to identify locations in memory to be accessed. In such a system, control over whether a particular software process can access a particular address is provided solely based on the page table structures used to provide the virtual-to-physical address translation mappings. However, such page table structures may typically be defined by an operating system and/or a hypervisor. If the operating system or the hypervisor is compromised then this may cause a security leak where sensitive information may become accessible to an attacker.

Therefore, for some systems where there is a need for certain processes to execute securely in isolation from other processes, the system may support operation in a number of domains and a number of distinct physical address spaces may be supported, where for at least some components of the memory system, memory access requests whose virtual addresses are translated into physical addresses in different physical address spaces are treated as if they were accessing completely separate addresses in memory, even if the physical addresses in the respective physical address spaces actually correspond to the same location in memory. By isolating accesses from different domains of operation of the processing circuitry into respective distinct physical address spaces as viewed for some memory system components, this can provide a stronger security guarantee which does not rely on the page table permission information set by an operating system or hypervisor.

The processing circuitry may support processing in a root domain which is responsible for managing switching between other domains in which the processing circuitry can operate. By providing a dedicated root domain for controlling the switching, this can help to maintain security by limiting the extent to which code executing in one domain can trigger a switch to another domain. For example the root domain may perform various security checks when a switch of domain is requested.

Hence, the processing circuitry may support processing being performed in one of at least three domains: the root domain, and at least two other domains. Address translation circuitry may translate a virtual address of a memory access performed from a current domain to a physical address in one of the plurality of physical address spaces selected based at least on the current domain.

The root physical address space may be exclusively accessible from the root domain. Hence, when the processing circuitry is operating in one of the other domains, the processing circuitry may not be able to access the root physical address space. This improves security by ensuring that code executing in one of the other domains cannot tamper with data or program code relied upon by the root domain for managing switching between domains or for controlling what rights the processing circuitry has when in one of the other domains. On the other hand, in examples, all of the plurality of physical address spaces may be accessible from the root domain. As the code executing in the root domain has to be trusted by any party providing code operating in one of the other domains, as the root domain code will be responsible for the switching into that particular domain in which that party's code is executing, then inherently the root domain can be trusted to access any of the physical address spaces. Making all of the physical address spaces accessible from the root domain allows to perform functions such as transitioning memory regions into and out of the domain, copying code and data into a domain e.g. during boot, and providing services to that domain.

DESCRIPTION OF EXAMPLES

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one of more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table (GPT) structure stored within the memory system. The granule protection information may be cached within a granule protection information cache 22, similar to a caching of page table data in the TLB 18. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

The PAS filter may act (in part) in response to a control signal (shown schematically as a signal 21) from the address translation circuitry, indicating that elision or deferral of at least some checking or other operations by the PAS filter may or should take place. These operations will be discussed in more detail below.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
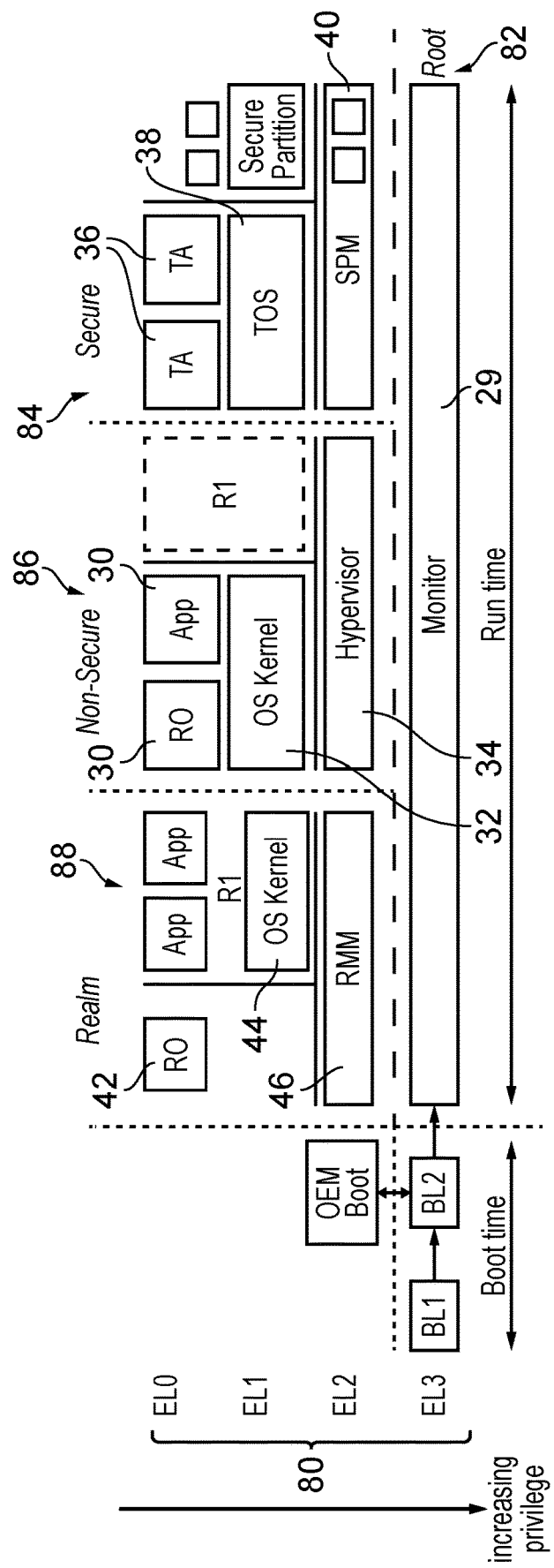
FIG. 2 illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, EL1, EL2 and EL3, where in this example EL3 refers to the exception level with the greatest level of privilege while EL0 refers to the exception level with the least privilege. [It will be appreciated that other architectures could choose the opposite numbering so that the exception level with the highest number could be considered to have the lowest privilege.] In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces.

Therefore, the processing circuitry 10 is configured to execute program instructions at a prevailing exception level selected from a hierarchy of exception levels, each exception level being associated with security privileges so that instructions executed at a higher exception level can access resources not accessible to instructions executed at a lower exception level. As discussed below, the processing circuitry is required to execute instructions at a highest of the exception levels (for example EL3) in order to set data from which the permission circuitry or PAS filter 20 detects permission information.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OM boot code may operate in the Secure domain. However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at EL1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 24. In the realm domain, the software executed can include a number of realms, where each realm can be isolated from other realms by a realm management module (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
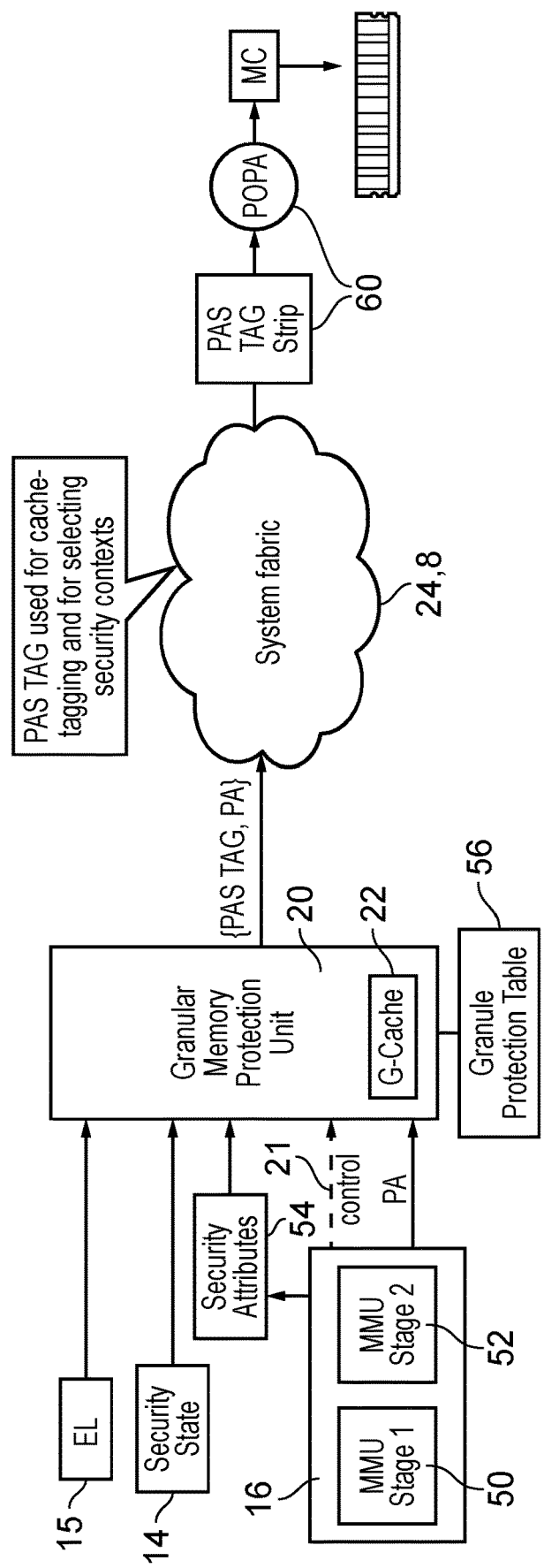
FIG. 3 illustrates an example of a processing system supporting granule protection lookups.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or EL1 code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or EL1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. This provides an example of permission circuitry (20) being configured to associate with a translated second memory address, data (PAS TAG) indicative of the region identifier associated with the translated second memory address.

The physical address and PAS identifier may be looked up in a granule protection table 56 which provides the granule protection information described earlier. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

In some examples, a so-called level 0 (L0) GPT check and a level 1 (L1) GPT check are provided. The L0 information indicates a memory type associated with a PA, and at least indicates whether so-called side-effects could potentially occur on a read access. For example, in the case of a PA allocated to an input/output device (which might provide data for reading from a first-in-first-out (FIFO) or other register), the act of reading data from that PA may change the data provided in response to a next read, by retrieving a data item from the FIFO register such that the retrieved data is no longer present for access by a next read operation. On the other hand, reading data from DRAM will not generally suffer such side-effects and will not change the data to be read by a next operation at the same PA.

Therefore, the L0 GPT check can be used (as a useful additional benefit) to detect whether such side-effects will potentially be experienced. If the answer is no, then there is no direct risk to the integrity of the data at a particular PA by initiation of a read operation at that PA.

The L0 GPT information, on which the check is based, can be relatively coarsely granulated, for example having a 1 GB granularity, so the size of the L0 GPT data to be consulted as part of an L0 GPT check can be relatively small (at potentially one data item per GB of physical address space). This in turn allows the L0GPT data to be cached relatively easily such that the L0GPT check can be conducted with relatively little impact on latency of the processes to be discussed below.

In general terms, conducting the L0 GPT check is an example of permission circuitry (such as the GMPU) performing a further operation to detect a storage type applicable to a given second (for example, physical) memory address, the storage type at least whether a first storage type or a second, different, storage type is applicable to the given second memory address. For example, the first storage type may be a storage type for which the data stored at a given address is not altered by a read operation from the given address (which is to say, a storage type not suffering "side-effects" as mentioned above).

The L1 GPT check can provide permission information and the PAS tag, for example.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the Master-side (requester side) without diminishing the security guarantees comparing to Slave-side (completer side) filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller that encrypts data before it is written to external DRAM. An example of such a Protection Engine will be discussed below.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System— "Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

The apparatus of FIG. 1 or FIG. 3 may be implemented as a so-called system on chip (SoC), a so-called network on chip (NoC) or as discrete components in various respective examples.

Figure 4:
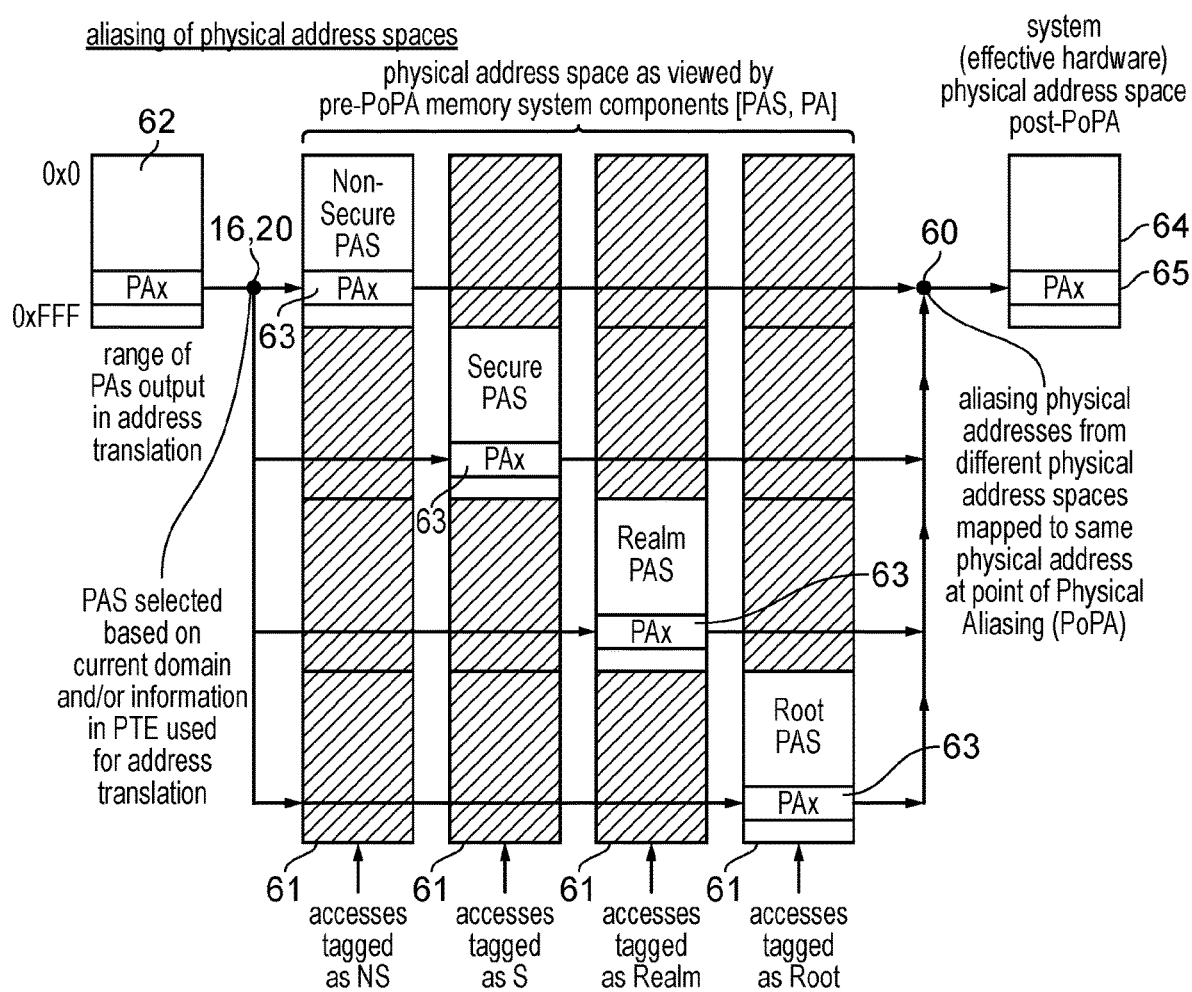
FIG. 4 schematically illustrates aliasing of a number of physical address spaces onto a system physical address space identifying locations in the memory system.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
|---|---|---|---|---|
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63, all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

Figure 14:
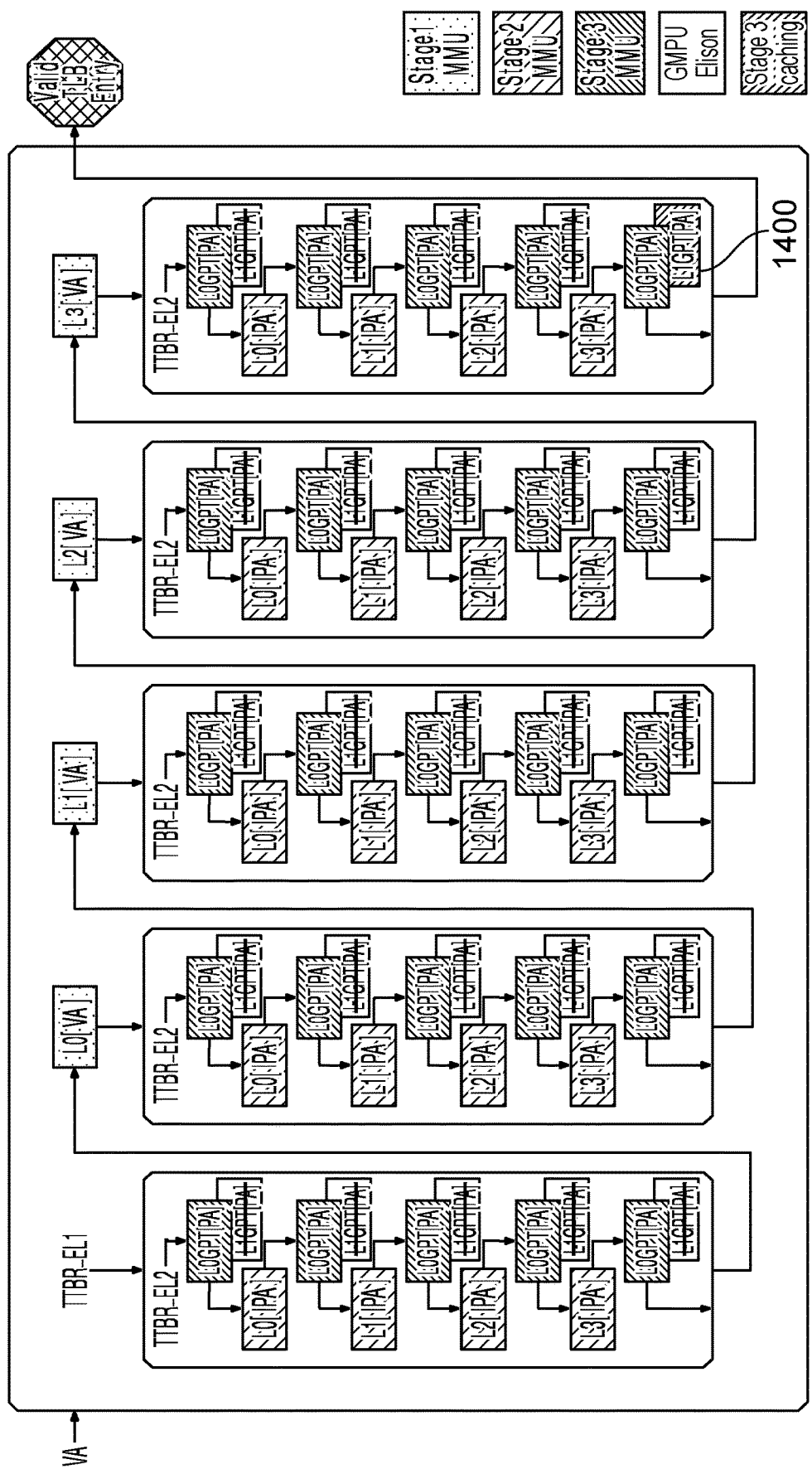
FIG. 14 schematically illustrates a two stage MMU with at least partial elision of granule protection operations.

The system may include more than one PoPA 60 (e.g. as shown in FIG. 14 discussed below).

At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

Figure 5:
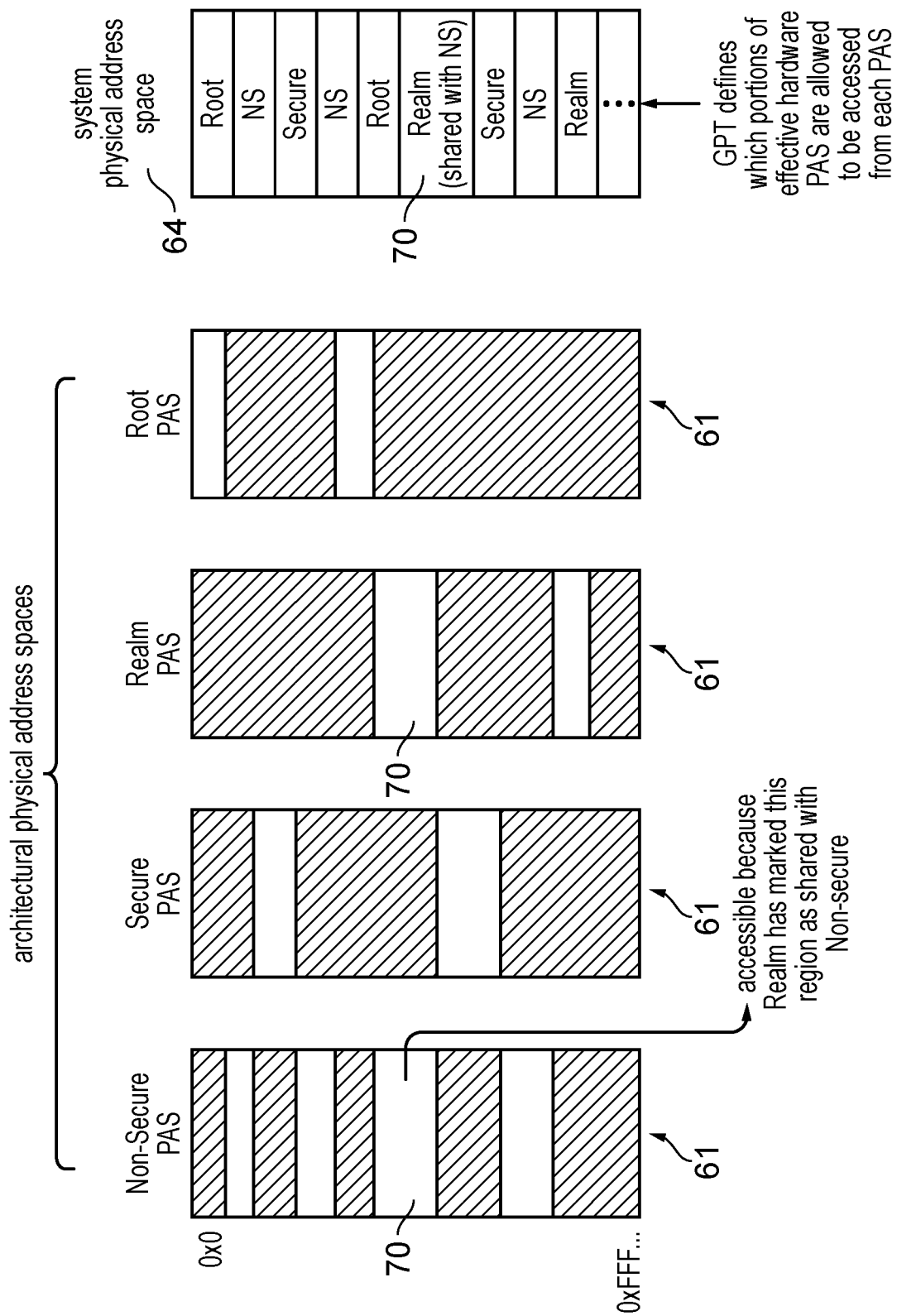
FIG. 5 illustrates an example of partitioning the effective hardware physical address space so that different architectural physical address spaces have access to respective portions of the system physical address space.

FIG. 5 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 5 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 26 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 5, without needing to change which domain is the assigned domain for region 70. This improves performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

The arrangement of FIG. 5 therefore provides an example of a memory having a plurality of memory partitions, each data memory partition being associated with a partition identifier and having a respective range of physical addresses within a physical address space.

The GMPU, as an example of permission circuitry, is configured, as the operation to detect permission information:

to detect a region identifier (e.g. the PAS TAG) associated with a second memory address, the region identifier being selected from a plurality of region identifiers, each region identifier serving to indicate permission to access a respective set of the memory partitions, in which for at least one of the region identifiers, the respective set of the memory partitions comprises a subset of one or more but not all of the memory partitions; and to compare the detected region identifier with a partition identifier (e.g. the PAS identified by the translation circuitry) associated with the second memory address.

Protection Engine

FIG. 6 and FIG. 7 provide schematic examples of a so-called Protection Engine which may be associated with physical memory 600.

The Protection Engine provides encryption and decryption circuitry to encrypt data for storage by the memory 600 and to decrypt data retrieved from the memory 600. The encryption and decryption circuitry is configured to apply a respective encryption and corresponding decryption, of a set of encryptions and corresponding decryptions, to PASs in the different realms, so that data encrypted to a given realm or memory partition by the respective encryption for that realm cannot be decrypted by applying the decryption for another realm.

The Protection Engine may make use of the PAS tag so as to apply an encryption to encrypt data to be stored to the memory and to apply a decryption to decrypt data retrieved from the memory at a translated second (physical) memory address, by applying an encryption and a decryption selected according to the PAS tag (the data indicative of the region identifier) associated with that physical memory address.

Referring to FIG. 6, a respective encryption/decryption circuitry 610, 612, 614, 616 is provided for each realm, and control/selection circuitry 620 selects the appropriate one of the encryption/decryption circuitries in response to the PAS tag associated with a particular memory access transaction.

In FIG. 7, a single encryption/decryption circuitry 700 is provided, with control circuitry 710 setting parameters such as an encryption/decryption key and/or an encryption/decryption algorithm or algorithm feature in dependence upon the PAS tag.

An effect of the use of the Protection Engine is to add a further layer of security to the other measures provided here TLB Operation Overview As mentioned above, the memory management unit 16 may be associated with a translation lookaside buffer (TLB) 18. Aspects of the operation of this arrangement are shown by the schematic flow chart of FIG. 8 in which, at a step 800, the MMU 16 receives a translation request. At a step 810, the MMU 16 detects whether the required translation is present in the TLB 18. If not, then the MMU 16 obtains the required translation using techniques to be discussed below and stores it to the TLB at a step 820.

Either following the step 820 or following the "yes" outcome of the step 810, at a step 830 the translation request is serviced from the data stored by the TLB.

MMU Operation Overview

Address translation takes place between a first memory address (such as a virtual address, VA) and a second memory address (such as a physical address, PA, or an intermediate physical address, IPA) and may make use of a so-called page table walk (PTW) process. The process involves consulting so-called page tables which store translation information. The page tables are provided as a hierarchy of page tables, so that an entry accessed in a first page table provides a pointer to a relevant next translation information entry in a next page table.

Therefore, in examples, a first (input) memory address to a translation process may comprise one of a virtual memory address and an intermediate physical address; and a second (output) memory address from the process comprises an intermediate physical address or a physical memory address.

In more detail, the PTW process involves traversing a hierarchical set of so-called page tables to arrive at a translation of a particular VA. In the case of a single stage memory translation, the output may be a PA. In the case of a multiple stage memory address translation, the process can be rather more involved. Accessing the page tables themselves requires a PA, so at each access of a next table in the hierarchy, a translation stage may itself be required in order to obtain the PA of the next required table.

Figure 9:
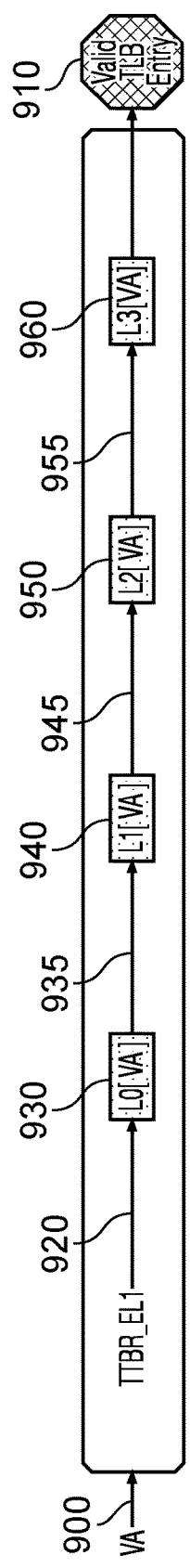
FIG. 9 schematically illustrates a single stage MMU.

An example of a so-called single stage memory address translation is illustrated schematically in FIG. 9 in which the first memory address is a virtual address (VA) 900 and the second memory address is a so-called physical memory address (PA). A valid TLB entry 910 generated by the process of FIG. 9 represents at least a mapping between the VA 900 and the translated PA. The mapping may be represented on a page or other memory region basis so that a single mapping stored in the TLB as a TLB entry 910 maps a set of contiguous virtual addresses to a corresponding set of contiguous physical addresses, for example mapping a page (for example of 4k memory addresses) to a corresponding page of physical addresses.

The address of a first page table in the hierarchy is provided by a register "translation table based register" (TTBR). The location of a first translation information entry 930 is provided by at least part of a memory address defined by the TTBR and at least part of the VA 900 to be translated. These two components form an address 920 of the first translation information entry L0[VA] 930. Looking up this first translation information entry 930 provides address information which may be combined with further bits of the VA 900 to generate an address 935 to access a next translation information entry 940. Again, data stored at that translation information entry, concatenated with further bits of the VA 900 provides the address 945 of an entry 950. Translation information stored at the entry 950, concatenated with further bits of the VA 900 provides an address 955 of a final translation information entry 960, with the data stored at the entry 960 being concatenated with final bits of the VA 900 to form the valid TLB entry 910.

As a worked example, a VA which requires translation is formed as a 48-bit value. Different portions of the VA are used at different stages in the PTW process.

To obtain a first entry in the page table hierarchy, the base address stored in the TTBR is obtained. A first portion of the VA, for example the 9 most significant bits, is added to the base address as an offset to provide the address of an entry in the L0 table. This lookup provides a base address of the L1 table.

At the second iteration, a further part of the VA, being for example the next 9 bits [38:30] of the VA, forms an offset from the base address of the L1 table in order to provide the address of an entry in the L1 table.

The process is repeated, for example using next offset portions bits [29:21] and bits [20:12] for L2 and L3 table accesses. Finally, the page table entry in the L3 table provides a page address and potentially some access permissions relating to a physical memory page. The remaining portion of the VA, for example the least significant 12 bits [11:0] provides a page offset within the memory page defined by that last page table entry, though in an example system which stores information as successive four byte (for example 32 bit) portions, it may be that the portion [11:2] provides the required offset to the address of the appropriate 32 bit word.

A page table entry may also provide an indication of whether the page has been written to (a so-called "dirty bit"), an indication of when it was last used (an "accessed bit,") in order to allow cache eviction or the like, and optionally other parameters.

The use of page tables in this way provides an example in which the translation information applicable to translation of a given first memory address comprises a hierarchy of translation information entries, in which data representing a translation information address of a next translation information entry is indicated by a preceding translation information entry. For example the data representing a translation information address of a next translation information entry may be indicative of a first memory address applicable to the next translation information entry; and the translation circuitry may be configured to perform the translation operation to generate a respective translation information address.

Two-Stage MMU Overview

In a so-called two-stage MMU, a VA is still translated to a PA, but this is via a two-stage process in which the VA is translated to a so-called intermediate physical address (IPA) which in turn translated to the required PA. The TTBR_EL1 lookups and stage 1 MMU page table lookups provide IPAs rather than PAs, and each of those IPAs has to be subject to a stage 2 translation even to look up the next page table entry.

Two-stage MMUs are used for various reasons, such as in order to provide further isolation between a processing element and/or a process executing on that processing element and the physical memory provided by the overall system. For example, translation from the VA to the IPA may be according to page tables (translation information entries) established by and controlled by an operating system, for example at a first security level such as a so-called exception level 1 (EL1). Translations from the IPA to the PA may be treated more securely, for example being under the control of a so-called hypervisor at a higher security or exception level such as EL2 in a hierarchy of exception levels such that operations at EL1 are unable to access system resources associated with EL2.

One effect of this arrangement is that each individual stage as illustrated in FIG. 9 now requires a further translation from the IPA represented by the translation table base register TTBR_EL1 into a PA to access the next translation information entry in physical memory.

Figure 10:
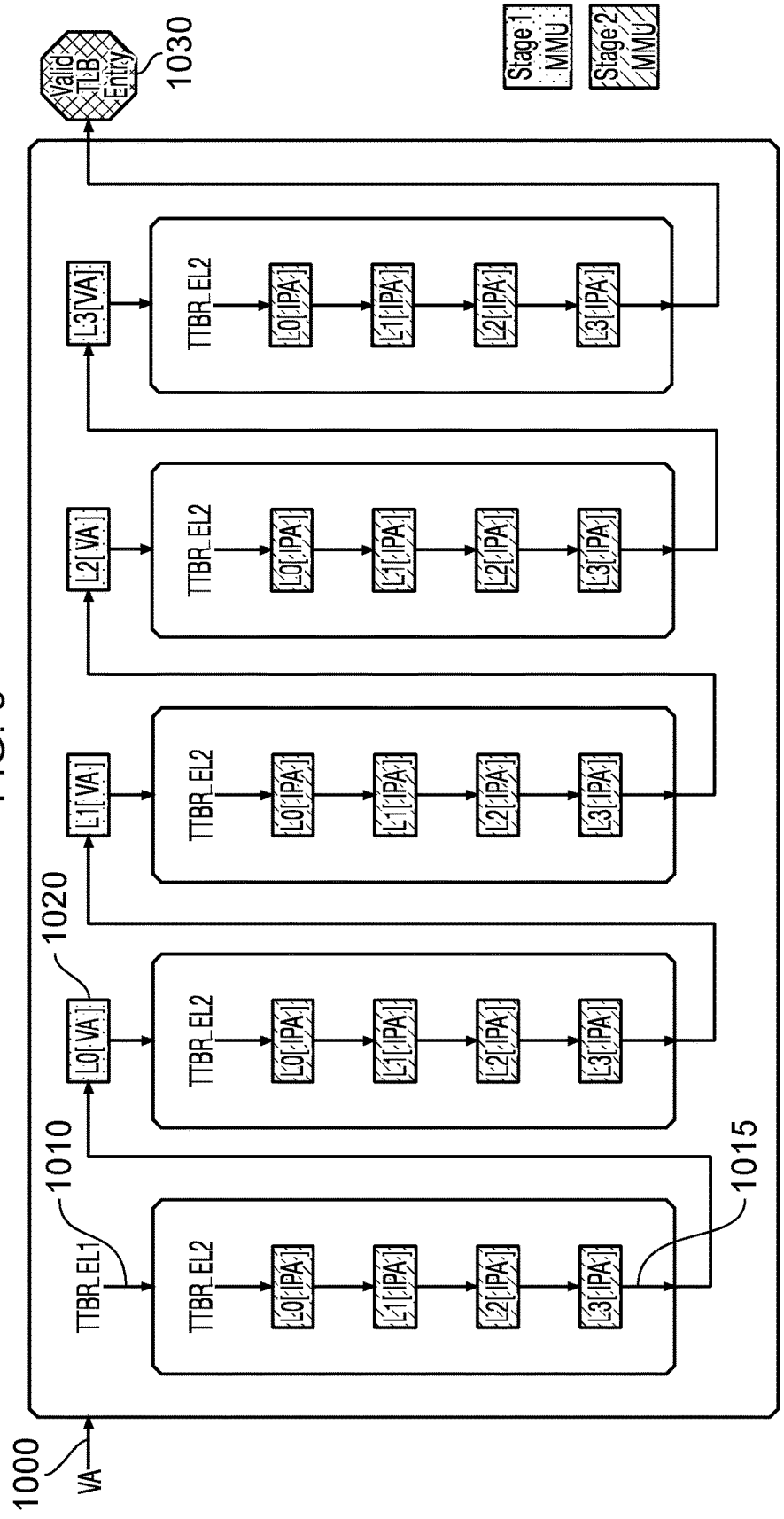
FIG. 10 schematically illustrates a two stage MMU.

So, referring to FIG. 10, upon receipt of a VA 1000 for translation, the stage 1 TTBR entry 1010 is accessed at EL1. This yields an IPA of the first translation information entry 1020. This IPA 1010 however has to be translated by the stage 2 MMU into a PA 1015 in order to access the entry 1020 in physical memory. The translation into the PA involves consulting a stage 2 TTBR at EL2 and performing a multiple stage page table walk to generate information 1015 which, when combined with bits of the VA 1000 provides the full physical address of the next translation table entry 1020. Similar processing is required for each level in the hierarchy of page table accesses in order to generate a valid TLB entry 1030.

Two-Stage MMU Involving GPT Checks

Figure 11:
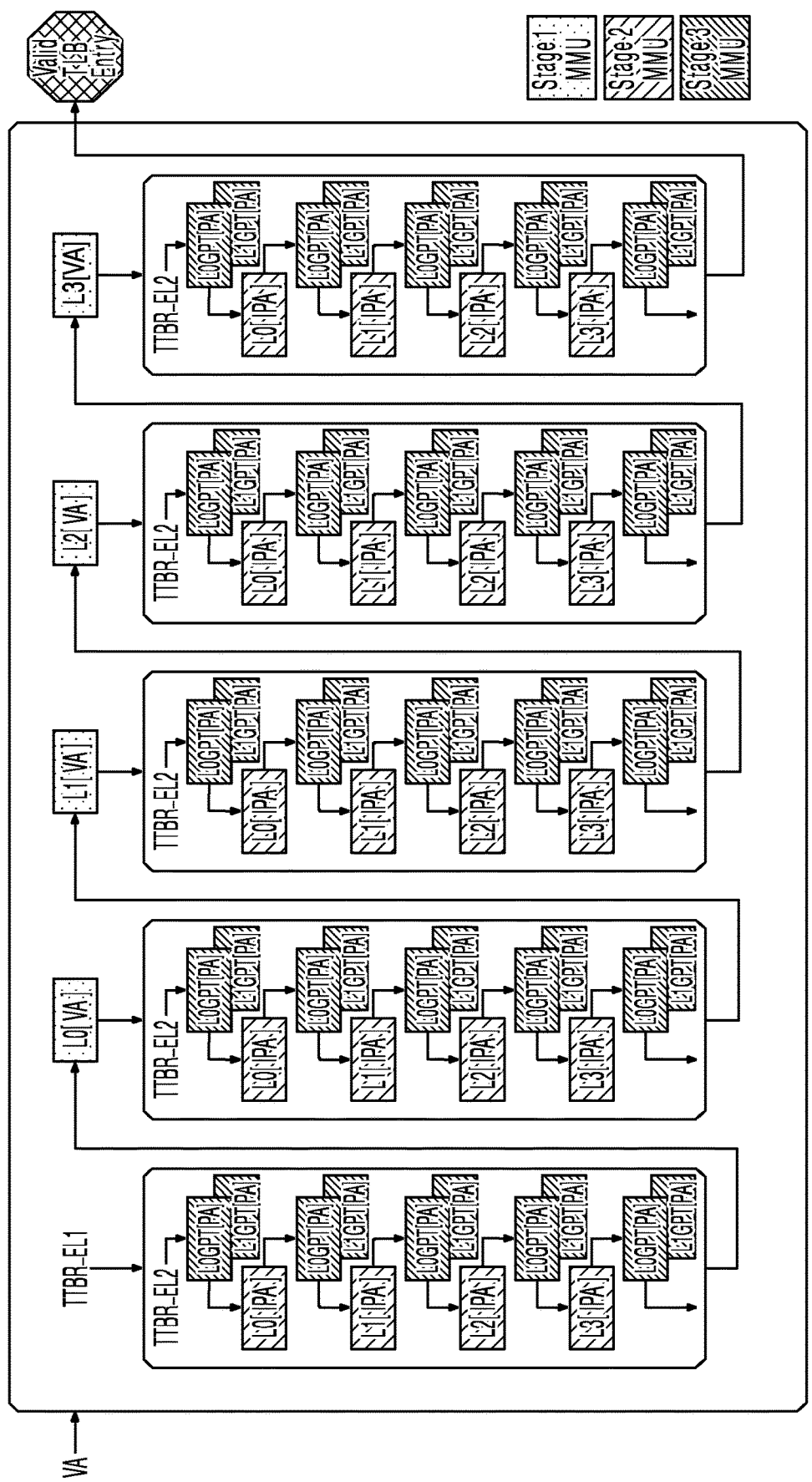
FIGS. 11 and 12 schematically illustrate the operation of (respectively) a two-stage MMU and a single stage MMU with granule protection operations.

Turning now to FIG. 11, a sequence of operations is illustrated, as involved in a two-stage MMU where permission information is obtained by the GMPU in a two-stage GMPU operation L0GPT and L1GPT for each physical address access.

Given that each of the operations illustrated in FIG. 11, namely table look ups for the VA translation, table look ups for the IPA translation and permission look ups by the GMPU requires a memory access, the number of accesses involved in the process of FIG. 11 can be significant.

Note that in FIG. 11 and some further examples discussed below, the GMPU check is refers to as "stage 3 GMPU". This terminology illustrates that it follows the last stage of MMU translation, and the terminology is used even in the case of a single stage MMU.

Single Stage MMU Involving GPT Checks

Figure 12:
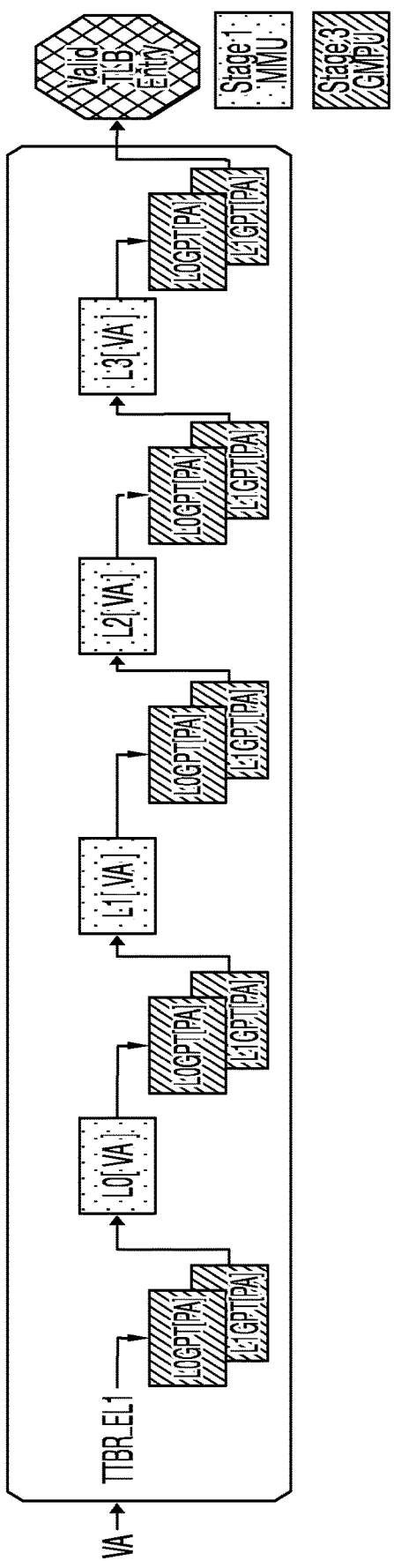

A similar arrangement, but for a single stage MMU configuration, is illustrated schematically in FIG. 12, in which each of the TTBR access and the four page tables accesses requires potentially two further memory accesses for the L0GPT and L1GPT.

Memory Access Cost

Assuming a "cold" (initially unpopulated) TLB, an estimate of the number of memory accesses needed in various configurations may be derived. In the following examples the working assumption is made that the page table(s) have four levels, but it is noted that the present embodiments are applicable to various different depths or numbers of levels of page table structures (and the cost may vary upwards for larger numbers of levels or downwards for smaller numbers of levels, though still a net cost relative to example embodiments of the disclosure). The relevant figures for a four-level page table structure are as follows:

| Single stage MMU | No GPT checks (FIG. 9) | 4 |
|---|---|---|
| | Full GPT checks (FIG. 12) | 14 |
| Two stage MMU | No GPT checks (FIG. 10) | 24 |
| | Full GPT checks (FIG. 11) | 74 |

Fully or Partially Eliding and/or Deferring GMPU Checks for MMU Accesses

It is possible in example embodiments for at least part of the GMPU check to be omitted or "elided" (corresponding noun: elision) for certain operations by the MMU. In other examples, at least part of the GMPU check may be deferred. In either case, the results of the operation may be used before the corresponding GMPU checks have been completed, either because they were deferred in starting or because they were never started.

Elision and/or deferral may be performed for some but not all accesses (that is to say, it may be performed selectively), for example as discussed in the embodiments described below. It may be requested or instructed by the MMU, for example using the control signal 21, or may be controlled by the GMPU according to which type of memory access is being initiated by the MMU (which again may optionally make use of control information via the connection 21). In such examples, the access circuitry may therefore selectively allow access even when the (full or partial) GMPU check has not completed.

In the example of deferral, it may be that the permission circuitry is configured to defer initiating the operation to detect permission information for a next translation information entry until after initiation of access to that next translation information entry.

In at least some examples, these operations relate to read operations of translation information by the MMU, or at least some of such read operations. This provides an example of the access circuitry being configured to access a translation information address without the permission circuitry having completed the operation to detect permission information, when the access to that translation information address relates to a read access; and the access circuitry being configured to access a translation information address only when the permission information indicates that memory access is permitted to that translation information address, when the access to that translation information address relates to a write access.

As background to the discussion of these example embodiments, it is noted that the MMU does not actually need the information provided by the GMPU from the GPT in order to form a correct page table access. Techniques relating to this aspect will be discussed below.

The MMU hardware itself may be trusted such that stored content which is read by the MMU is not visible to host or other software, which is to say that individual instances of translation information are used only within the MMU and are not provided as an output to external hardware or indeed software. In the case of the (at least partial) elision of GPT checks, this can provide an example in which the permission circuitry is configured not to perform the operation to detect permission information in respect of at least some of the translation information addresses; and the translation circuitry is configured not to provide, as an output to circuitry external to the translation circuitry, translation information retrieved from a translation information address in respect of which the operation to detect permission information has not been completed.

Note that a main performance impact, caused by the number of memory accesses, in the arrangements shown in FIGS. 11 and 12 relate to read operations by the MMU. Write operations by an MMU are somewhat less common (for example writing to an accessed bit or dirty bit of a page descriptor in a page table) and although at least in principle elision of the type described here could be applied to write operations as well as to read operations, in the example embodiments to be described below, the elision is restricted to read operations. This has the potential benefit that the security risk in allowing certain MMU read operations to proceed without having completed the GMPU checks is perceived to be somewhat lower than the security risk associated with allowing the MMU to write data without having completed the appropriate GMPU checks. Therefore, in at least example embodiments, all writes to memory, whether by the MMU or initiated any other aspect of the overall system, are constrained to be allowed only if validated by the full GMPU check arrangements.

Security Features

In order to avoid or at least alleviate a security risk by allowing elision and/or deferral of GMPU checks for MMU read accesses of translation information, the following security feature may be provided by the hardware design, which is that:
  (a) external hardware and software has no direct access to data read by the MMU.

In other words, any data value read into the MMU is (in example embodiments) guaranteed to remain private within the MMU. Other example measures which can optionally be applied (individually or collectively) are as follows:
  (b) Translation faults and the like are fully dealt with and any granule protection fault occurring with respect to a page table (translation information) access is reported to a process running at EL3. This provides an example in which the translation circuitry is configured to detect a translation fault in respect of a given translation operation when use, by the translation circuitry, of the translation information does not provide a valid address translation; and in response to detection of a translation fault, the translation circuitry is configured to control the permission circuitry to perform the operation to detect permission information in respect of any translation information addresses accessed as part of the given translation operation.
  (c) Memory encryption and decryption may be in place, with for example a separate key and/or algorithm for each world or realm, for example by the techniques of FIG. 6 or 7. This can mitigate against so-called side-channel analysis of translation behaviour.
  (d) The page table walk process is inhibited from read access to input/output address spaces. This may be achieved by eliding only part of the GMPU check but retaining a part of the GMPU check relating to a memory type associated with each address, for example by providing the L0GPT check but eliding or deferring the L1GPT check, so that MMU access is allowed only to memory regions having no "side-effects" as discussed above. Examples of this technique will be discussed below.
  (e) Restricting elision and/or deferral to MMU read accesses (that is to say, providing full GMPU checks for write accesses by the MMU)

Cache and Memory Access

In terms of cache storage in the caches 24 shown in the example described above, attempting to access a secure cache line using, for example, a non-secure PAS tag will not even observe that PA in the cache.

If data is written into a cache using the "wrong" PAS, it is benign, in that it cannot be subsequently accessed or written back to main memory. Instead, it will simply remain in the cache until overwritten by a routine cache management and eviction policy operated by the cache itself.

A further level of security is provided by the encryption arrangement discussed earlier and mentioned in point (c) above. This uses memory encryption associated with each PAS such that if the "wrong" PAS tag is associated with a PA, an attempt may be made to decrypt the contents of the memory at a particular address but that attempt will be unsuccessful.

These arrangements provide an example in which the cache memory associates a respective region identifier with each data item held by the cache memory; and the cache memory being configured to inhibit access to a data item associated with a given region identifier in response to a memory access associated with data indicating a different region identifier.

Example—Single Stage, Elision of L1GPT Check

Figure 13:
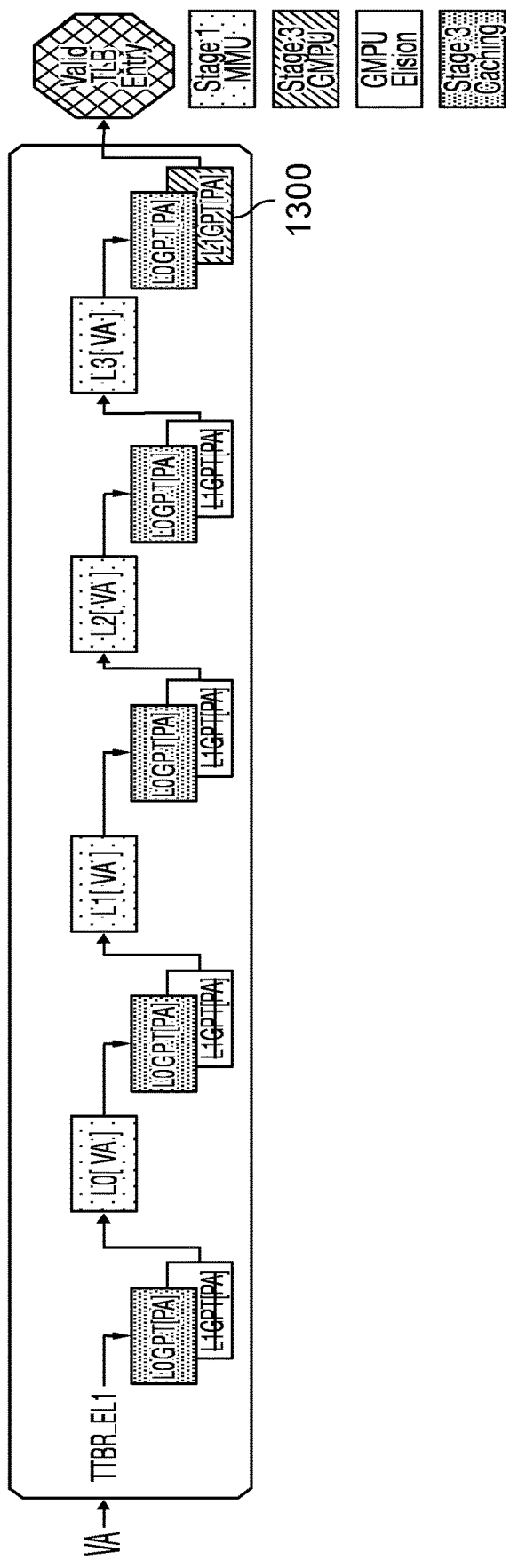
FIG. 13 schematically illustrates a single stage MMU with at least partial elision of granule protection operations.

In FIG. 13, for each proposed access to a PA, the level 0 GPT check (L0GPT) is performed to detect the memory region type as discussed above, and in particular whether the memory region relates to input/output devices or memory which can be read without "side-effects" in terms of the read operation itself altering the data stored at that address.

As mentioned above, the GPT data required for this particular check may be relatively compact, for example one data item per GB, and so in example arrangements it is cached either in a bespoke cache maintained by the MMU or in a system cache, such that the performance penalty in obtaining the L0GPT data for a particular memory access is relatively low.

However, in the example of FIG. 13, the L1GPT check is omitted or elided for all memory accesses involved in the single stage MMU operation except for the final stage leading to the population of the TLB entry.

Accordingly, this arrangement allows for the speculative loading of data which has not been subject to an L1GPT check. In order for this to occur, a PAS tag value may be assumed for the data access, for example by the GMPU associating a default PAS tag with the access. In other examples, the PAS tag of the page table walks can be derived directly from a "security state" that the page table is associated with, optionally combined with an (optional) bit in Stage 1 or Stage 2 page table (the bit is called "NS" to indicate whether the state "non-secure"). Therefore in such examples the GPT is not required in order to submit a correct page table access (for example initiated by the present techniques). The GMPU in such examples needs only to verify that the PAS tag is a one that is "allowed" for the security state—in accordance with the table provided above.

A final check is provided to validate the final address to be populated into the TLB entry.

A potential saving in the comparison of FIG. 13 with FIG. 12, is of the order of four memory accesses in the generation of an address translation, of the 14 which were required in the arrangement of FIG. 12. In the example arrangements, five of the remaining memory accesses may be with respect to cached L0GPT data.

This use of the L0GPT checks provides an example in which the access circuitry is configured to access a translation information address without the permission circuitry having completed the operation to detect permission information to indicate whether memory access is permitted to that translation information address only when the storage type applicable to the translation information address is the first storage type discussed above (and not, for example, a second storage type such as one which may potentially suffer "side-effects").

Example—Two Stage, Elision of L1GPT Check

FIG. 14 shows a similar arrangement to that of FIG. 11, but once again with the L1GPT checks elided except for the very last one resulting in the population of the TLB entry. This can reduce the 74 accesses mentioned above by 24, with 25 of the remaining accesses being with respect to cached L0GPT data.

Disabling of Elision

Optionally, code at EL3 can disable elision if a fault, or if certain type of fault such as a general protection fault, resulted from a page table access.

Optionally, code at EL3 can require full GPT checks to be re-performed in respect of an MMU translation if a translation or other fault occurred.

Further Examples—Single Stage, Deferral of L1GPT Check

Figure 15:
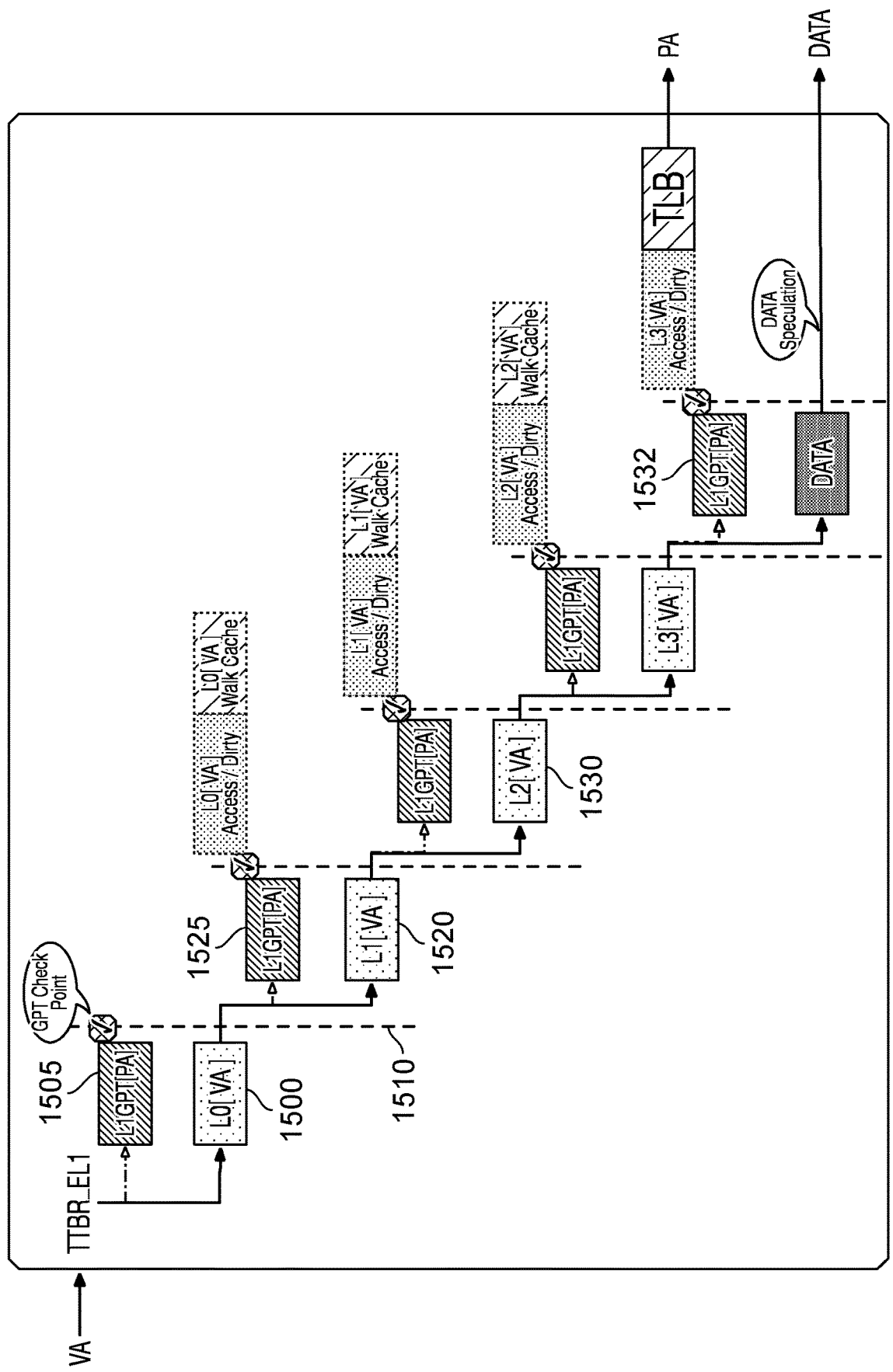
FIGS. 15 and 16 schematically illustrate MMU operations with deferral of granule protection operations.
Figure 16:
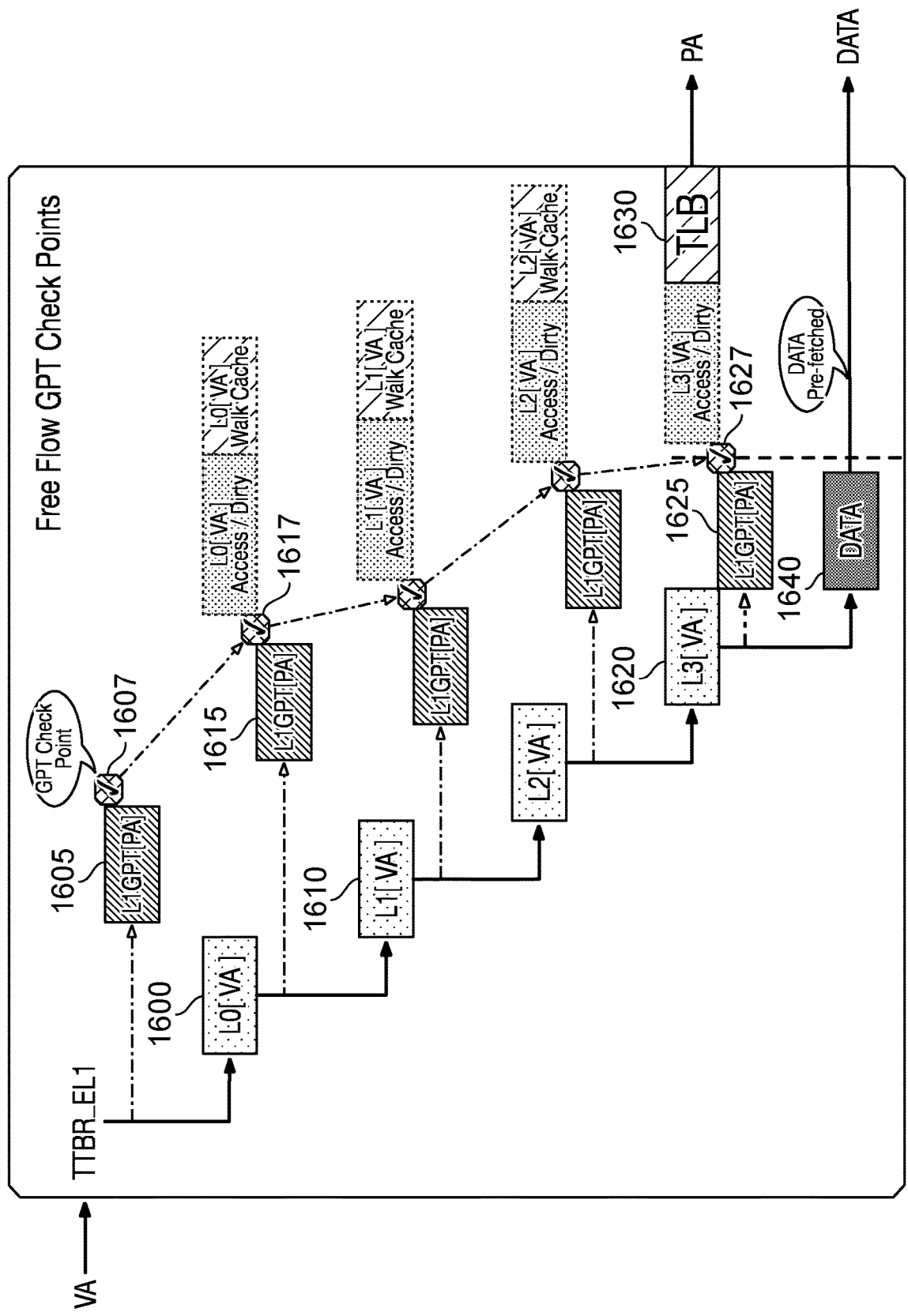

FIGS. 15 and 16 provided deferred checking, with both arrangements allowing for the loading by the MMU of unchecked data with an assumed PAS tag. Note that both FIGS. 15 and 16 relate (for the purposes of discussion of examples) to single stage MMU operations but corresponding techniques can be used for two stage MMU operations. Note that the L0GPT checks relevant to FIGS. 15 and 16 are not shown but are assumed to take place before the relevant address is used in a memory access.

In FIG. 15, the L0 page table access 1500 is performed before completion of the L1GPT check 1505 of the page table base address provided by TTBR_EL1. In the example shown, both accesses are started at generally the same time but the use of this technique simply requires that the check 1505 is not complete at the time that the relevant information is actually use to access the first level of the page table at 1500.

The example of FIG. 15 does impose a requirement in some examples that the PAS assumed to be associated with a read access is validated before the resulting data can be used or cached. This is represented by a broken vertical line 1510 representing a GPT checkpoint. In other words, the data read from the L0 page table access 1500 is not used further until the address by which that data was obtained, namely the page table base address in TTBR_EL1, is itself validated.

Similarly, the L1 page table entry access 1520 can be started before its address (the output of the access 1500) has been validated by the step 1525, but in the example of FIG. 15, the next level address information read by the access 1520 cannot itself be used (in a subsequent access 1530 until the L1GPT check 1525 relating to the address by which the access 1520 was performed is itself complete.

The arrangement of FIG. 15 can be implemented in some examples by the dual, or parallel, issue of a GPT L1 check and a next page table entry read operation, for example the parallel or dual issue of the accesses 1505 and 1500. This means that the page table entry read operation is performed without its address having been fully checks and with an assumed PAS. However, by providing the GPT checkpoints such as the checkpoint 1510 upon read completion, any memory access faults or translation faults resulting from the reading of so-called "bad" data are handled synchronously in that they occur at or in response to the MMU operation to which they relate. Secondary speculative page table entry reads are not issued from unchecked data, which can help to avoid cache side channel attacks or other issues.

At the GPT check points in FIG. 15, accessed/dirty bit updates may be performed (noting that as mentioned above, in example embodiments any write operations by the MMU require a full L1GPT check prior to implementation) and TLB and walk caches may be populated.

In another arrangement shown schematically in FIG. 16, once again the loading or reading of unchecked data with assumed PAS values is permitted, and the loaded data values can themselves be used as inputs to subsequent load operations. However, the assumed PAS values are validated by completion of the respective L1GPT checks before the final data can be committed or cached.

Referring to FIG. 16, the page table base address provided by TTBR_EL1 is used in a first read operation 1600 the results of which may be used in a second read operation 1610, and so on through to a fourth read operation 1620 relating to the fourth page table walk operation. Separately, a chain of L1GPT checks is initiated so that the base address provided by TTBR_EL1 is subject to an L1GPT check 1605 and, assuming that this check passes at a checkpoint 1607, a detection is made as to whether a second L1GPT check 1615 of the output of the read operation 1600 is passed 1617 and so on. The chain of L1GPT checks continues through to an L1GPT check 1625 of the address or address portion read from the operation 1620, with the passing 1627 of the check 1625 being a condition to (a) the population of the TLB entry 1630 and the prefetching of data 1640 at the translated address.

As above, at the GPT check points in FIG. 16, accessed/dirty bit updates may be performed (noting that as mentioned above, in example embodiments any write operations by the MMU require a full L1GPT check prior to implementation) and TLB and walk caches may be populated.

Two Stage MMU Examples

In a two-stage MMU, any of the techniques described here can be applied to one stage individually but not to the other stage (either way round), or can be applied to both stages.

Further Examples

A further example of selectively allowing access is as follows.

The permission circuitry may select, or be controlled by the translation circuitry to select a separate arrangement for each PTE access (or for sub-groups of PTE accesses), in other words defer, elide or retain (not defer or elide) the corresponding full or part permission check.

As an example, for a case in which both Stage 1 and Stage 2 are enabled the permission circuitry can be configured to (selecting for itself or under the control of the translation circuitry):
  for each stage 1 MMU read operation, perform the corresponding permission check before the stage 1 read or defer it for completion by no later than a point at which the result is used to drive a subsequent stage 2 read;
  for the final stage 2 read operation (which obtains data defining the output address for the requested memory address translation), perform the permission check before the stage 2 read or defer it for completion by no later than a point before the output address is committed or otherwise used;
  for all the other stage 2 read operations: elide the permission circuitry check.

Such an implementation could inhibit an attacker from using a stage-2 table controlled by the attacker as a Spectre-like revelation attack that could disclose the content of elided Stage 1 checks.

More generally, different patterns of elision and/or deferral could be used, for example random or pseudorandom patterns.

Overview of Example Techniques

Various example arrangements, as discussed above, envisage at least the following options and variations, all of which are within the scope of the present disclosure as defined by the appended claims:
  a) entire or partial elision of omission of at least some permission information (e.g. GPT) checks (e.g. FIGS. 13, 14)
  b) proceeding with a translation information (e.g. PTE) access and starting the GPT check at the same time, or at least such that the GPT check is not complete by the time the PTE access is initiated
  c) as (b), with the results of the GPT check for a PTE access being required before use is made of that PTE access for a next MMU operation (e.g. before a next PTE access, using information retrieved from that PTE access, is initiated) (e.g. FIG. 15)
  d) as (b) but with the results of the GPT check for a PTE access being required before a result is committed, for example before writing of any results such as a TLB entry or fetching of a translated address is initiated (e.g. FIG. 16)
  e) as in any of (b) to (d), in which a part of the GPT check such as L0GPT is carried out before the relevant PTE access, but the remainder of the GPT check, L1GPT in the examples, is the part with deferred completion An example of (c) is a so-called "lock-step" variant where the GPT check is initiated in parallel with the memory access of a page table walk but the GMPU check itself is deferred to a point before the result of that memory access is used (e.g. for driving the next walk).

Summary Method

Figure 17:
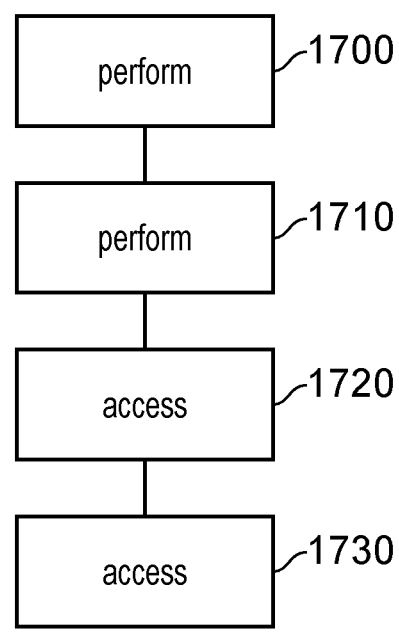
FIG. 17 is a schematic flowchart illustrating a method.

FIG. 17 is a schematic flowchart illustrating a method comprising:
  performing (at a step 1700) a translation operation to generate a translated second memory address within a second memory address space as a translation of a first memory address within a first memory address space, comprising generating the translated second memory address in dependence upon translation information stored at one or more translation information addresses;
  performing (at a step 1710) an operation to detect permission information to indicate, for a given second memory address, whether memory access is permitted to the given second memory address;
  accessing (at a step 1720) data stored at the given second memory address when the permission information indicates that memory access is permitted to the given second memory address; and
  accessing (at a step 1730) a translation information address without the permission circuitry having completed the operation to detect permission information to indicate whether memory access is permitted to that translation information address.

Summary Apparatus Features

The arrangements of FIGS. 1 and 3, operating in accordance with the techniques discussed above, provide an example of apparatus comprising:
  translation circuitry 16 (50, 52) to perform a translation operation to generate a translated second memory address within a second memory address space as a translation of a first memory address within a first memory address space, in which the translation circuitry is configured to generate the translated second memory address in dependence upon translation information stored at one or more translation information addresses;
  permission circuitry 20, 22 to perform an operation to detect permission information to indicate, for a given second memory address, whether memory access is permitted to the given second memory address; and
  access circuitry 20 to access data stored at the given second memory address when the permission information indicates that memory access is permitted to the given second memory address; and
  the access circuitry being configured to access a translation information address without the permission circuitry having completed the operation to detect permission information to indicate whether memory access is permitted to that translation information address.

In example arrangements the translation circuitry 16 is operable in respect of memory access transactions, each memory access transaction being associated with a first memory address for translation, the translation circuitry associating a translated second memory address with each memory access transaction; and the permission circuitry 20 is configured to perform the operation to detect permission information with respect to the translated second memory address for each memory access transaction (for example, the L1GPT checks 1300, 1400, 1532, 1625, the access circuitry being configured to provide the results of an access to the translated second memory address for a memory access transaction only when access to that translated second memory address is permitted by the permission data.

Simulator Implementation

Figure 18:
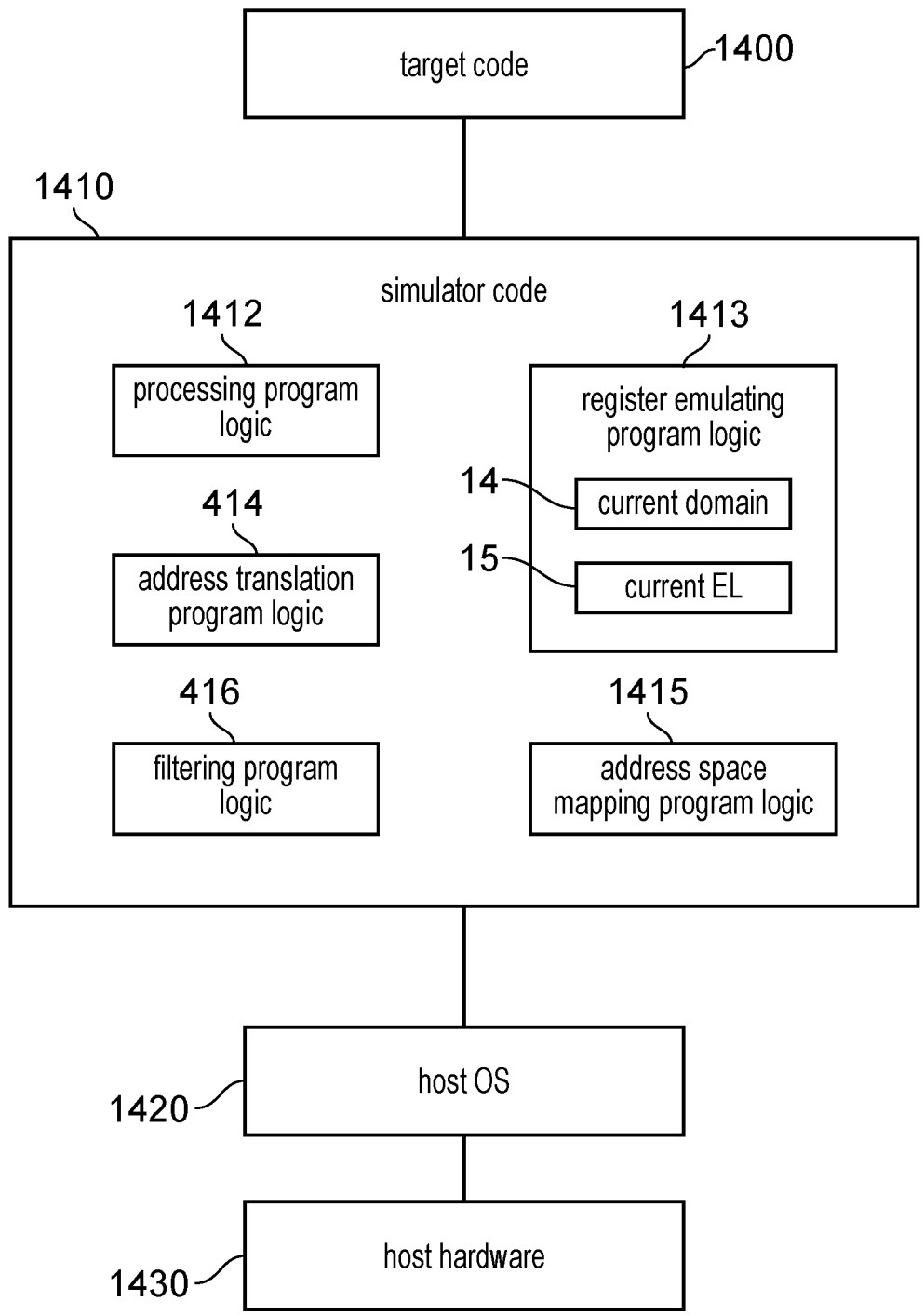
FIG. 18 shows a simulator example that may be used.

FIG. 18 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1430, optionally running a host operating system 1420, supporting the simulator program 1410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1430), some simulated embodiments may make use of the host hardware, where suitable.

The simulator program 1410 may be stored on a computer-readable storage medium (which may be a non-transitory medium), and provides a program interface (instruction execution environment) to the target code 1400 (which may include applications, operating systems and a hypervisor) which is the same as the interface of the hardware architecture being modelled by the simulator program 1410. Thus, the program instructions of the target code 1400 may be executed from within the instruction execution environment using the simulator program 1410, so that a host computer 1430 which does not actually have the hardware features of the apparatus 2 discussed above can emulate these features. This can be useful, for example, for allowing testing of target code 1400 being developed for a new version of a processor architecture before hardware devices actually supporting that architecture are yet available, as the target code can be tested by running within the simulator executing on a host device which does not support that architecture.

The simulator code includes processing program logic 1412 which emulates the behaviour of the processing circuitry 10, e.g. including instruction decoding program logic which decodes instructions of the target code 1400 and maps the instructions to corresponding sequences of instructions in the native instruction set supported by the host hardware 1430 to execute functions equivalent to the decoded instructions. The processing program logic 1412 also simulates processing of code in different exception levels and domains as described above. Register emulating program logic 1413 maintains a data structure in a host address space of the host processor, which emulates architectural register state defined according to the target instruction set architecture associated with the target code 1400. Hence, instead of such architectural state being stored in hardware registers 12 as in the example of FIG. 1, it is instead stored in the memory of the host processor 1430, with the register emulating program logic 1413 mapping register references of instructions of the target code 1400 to corresponding addresses for obtaining the simulated architectural state data from the host memory. This architectural state may include the current domain indication 14 and current exception level indication 15 described earlier.

The simulation code includes address translation program logic 1414 and filtering program logic 1416 which emulate the functionality of the address translation circuitry 16 and PAS filter 20 respectively, with reference to the same page table structures and GPT 56 as described earlier. Hence, the address translation program logic 1414 translates virtual addresses specified by the target code 1400 into simulated physical addresses in one of the PASs (which from the point of view of the target code refer to physical locations in memory), but actually these simulated physical addresses are mapped onto the (virtual) address space of the host processor by address space mapping program logic 1415. The filtering program logic 1416 performs a lookup of granule protection information to determine whether to allow memory accesses triggered by the target code to proceed, in the same way as the PAS filter described above.

Therefore the arrangement of FIG. 18 provides an example of a computer program for controlling a host data processing apparatus to provide an instruction execution environment for execution of target code; the computer program comprising:

translation logic to perform a translation operation to generate a translated second memory address within a second memory address space as a translation of a first memory address within a first memory address space, in which the translation logic is configured to generate the translated second memory address in dependence upon translation information stored at one or more translation information addresses;

permission logic to perform an operation to detect permission information to indicate, for a given second memory address, whether memory access is permitted to the given second memory address; and access logic to allow access to data stored at the given second memory address when the permission information indicates that memory access is permitted to the given second memory address;

the access logic being configured to selectively allow access by the translation logic to a translation information address without the permission logic having completed the operation to detect permission information to indicate whether memory access is permitted to that translation information address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
translation circuitry to perform a translation operation to generate a translated second memory address within a second memory address space as a translation of a first memory address within a first memory address space, in which the translation circuitry is configured to generate the translated second memory address in dependence upon translation information stored at one or more translation information addresses;
permission circuitry to perform an operation to detect permission information to indicate, for a given second memory address, whether memory access is permitted to the given second memory address; and,
access circuitry to allow access to data stored at the given second memory address when the permission information indicates that memory access is permitted to the given second memory address;
the access circuitry being configured to selectively allow access by the translation circuitry to a translation information address without the permission circuitry having completed the operation to detect permission information to indicate whether memory access is permitted to that translation information address.

2. The apparatus of claim 1, in which:
the access circuitry is configured to selectively allow access by the translation circuitry to a translation information address without the permission circuitry having completed the operation to detect permission information, when the access to that translation information address relates to a read access; and,
the access circuitry is configured to allow access to a translation information address only when the permission information indicates that memory access is permitted to that translation information address, when the access to that translation information address relates to a write access.

3. The apparatus of claim 1, in which the permission circuitry is configured to perform a further operation to detect a storage type applicable to a given second memory address, the storage type at least whether a first storage type or a second, different, storage type is applicable to the given second memory address.

4. The apparatus of claim 3, in which the access circuitry is configured to selectively allow access by the translation circuitry to a translation information address without the permission circuitry having completed the operation to detect permission information to indicate whether memory access is permitted to that translation information address only when the storage type applicable to the translation information address is the first storage type.

5. The apparatus of claim 4, in which the first storage type is a storage type for which the data stored at a given address is not altered by a read operation from the given address.

6. The apparatus of claim 1, in which:
the permission circuitry is configured not to perform the operation to detect permission information in respect of at least some of the translation information addresses; and,
the translation circuitry is configured not to provide, as an output to circuitry external to the translation circuitry, translation information retrieved from a translation information address in respect of which the operation to detect permission information has not been completed.

7. The apparatus of claim 1, in which the translation information applicable to translation of a given first memory address comprises a hierarchy of translation information entries, in which data representing a translation information address of a next translation information entry is indicated by a preceding translation information entry.

8. The apparatus of claim 7, in which:
the data representing a translation information address of a next translation information entry is indicative of a first memory address applicable to the next translation information entry; and,
the translation circuitry is configured to perform the translation operation to generate a respective translation information address.

9. The apparatus of claim 7, in which the permission circuitry is configured to defer initiating the operation to detect permission information for a next translation information entry until after initiation of access to that next translation information entry.

10. The apparatus of claim 1, in which:
the translation circuitry is operable in respect of memory access transactions, each memory access transaction being associated with a first memory address for translation, the translation circuitry associating a translated second memory address with each memory access transaction; and,
the permission circuitry is configured to perform the operation to detect permission information with respect to the translated second memory address for each memory access transaction, the access circuitry being configured to provide the results of an access to the translated second memory address for a memory access transaction only when access to that translated second memory address is permitted by the permission data.

11. The apparatus of claim 1, in which:
the first memory address comprises one of a virtual memory address and an intermediate physical address; and,
the second memory address comprises an intermediate physical address or a physical memory address.

12. The apparatus of claim 11, comprising a memory having a plurality of memory partitions, each data memory partition being associated with a partition identifier and having a respective range of physical addresses within a physical address space.

13. The apparatus of claim 12, in which the permission circuitry if configured, as the operation to detect permission information:
to detect a region identifier associated with a second memory address, the region identifier being selected from a plurality of region identifiers, each region identifier serving to indicate permission to access a respective set of the memory partitions, in which for at least one of the region identifiers, the respective set of the memory partitions comprises a subset of one or more but not all of the memory partitions; and,
to compare the detected region identifier with a partition identifier associated with the second memory address.

14. The apparatus of claim 12, comprising:
encryption and decryption circuitry to encrypt data for storage by the memory and to decrypt data retrieved from the memory;
in which the encryption and decryption circuitry is configured to apply a respective encryption and corresponding decryption, of a set of encryptions and corresponding decryptions, to each memory partition, the set of encryptions and corresponding decryptions being such that data encrypted to a given memory partition by the respective encryption for that memory partition cannot be decrypted by applying the decryption for another memory partition.

15. The apparatus of claim 14, in which the permission circuitry is configured to associate with a translated second memory address, data indicative of the region identifier associated with the translated second memory address.

16. The apparatus of claim 15, in which the encryption and decryption circuitry is configured to apply a decryption to decrypt data retrieved from the memory at a translated second memory address by applying a decryption selected according to the data indicative of the region identifier associated with that translated second memory address.

17. The apparatus of claim 15, comprising one or more cache memories to hold data retrieved from and/or for storage to the memory;
the cache memory associating the respective region identifier with each data item held by the cache memory;
the cache memory being configured to inhibit access to a data item associated with a given region identifier in response to a memory access associated with data indicating a different region identifier.

18. The apparatus of claim 1, in which:
the translation circuitry is configured to detect a translation fault in respect of a given translation operation when use, by the translation circuitry, of the translation information does not provide a valid address translation; and,
in response to detection of a translation fault, the translation circuitry is configured to control the permission circuitry to perform the operation to detect permission information in respect of any translation information addresses accessed as part of the given translation operation.

19. The apparatus of claim 1, comprising:
a processor to execute program instructions at a prevailing exception level selected from a hierarchy of exception levels, each exception level being associated with security privileges so that instructions executed at a higher exception level can access resources not accessible to instructions executed at a lower exception level;
in which the processor is required to execute instructions at a highest of the exception levels in order to set data from which the permission circuitry detects permission information.

20. A method comprising:
performing a translation operation to generate a translated second memory address within a second memory address space as a translation of a first memory address within a first memory address space, comprising generating the translated second memory address in dependence upon translation information stored at one or more translation information addresses;
performing an operation to detect permission information to indicate, for a given second memory address, whether memory access is permitted to the given second memory address;
accessing data stored at the given second memory address when the permission information indicates that memory access is permitted to the given second memory address; and,
selectively accessing a translation information address without the permission circuitry having completed the operation to detect permission information to indicate whether memory access is permitted to that translation information address.

* * * * *